United States Patent [19]
Terada

[11] 4,348,200
[45] Sep. 7, 1982

[54] MULTI-SPEED SPROCKET ASSEMBLY FOR A BICYCLE

[75] Inventor: Masao Terada, Sakai, Japan

[73] Assignee: Shimano Industrial Company Limited, Osaka, Japan

[21] Appl. No.: 188,296

[22] Filed: Sep. 18, 1980

[30] Foreign Application Priority Data

Oct. 11, 1979 [JP] Japan .......................... 54-141001[U]

[51] Int. Cl.³ ...................... F16H 55/30; F16H 11/08
[52] U.S. Cl. .................................................. 474/160
[58] Field of Search ......................................... 474/160

[56] References Cited
U.S. PATENT DOCUMENTS

| | | | |
|---|---|---|---|
| 1,202,227 | 10/1916 | Sandifur | 474/160 X |
| 3,661,021 | 5/1972 | Ohshita | 474/160 X |
| 3,709,053 | 1/1973 | Ohshita | 474/160 X |
| 4,259,880 | 4/1981 | Ueno | 474/160 X |

FOREIGN PATENT DOCUMENTS 2836258 3/1979 Fed. Rep. of Germany.

*Primary Examiner*—Allan D. Herrmann
*Attorney, Agent, or Firm*—Stevens, Davis, Miller & Mosher

[57] ABSTRACT

A multi-speed sprocket assembly comprising at least one small diameter sprocket and at least one larger diameter sprocket. The larger diameter sprocket has at least two adjacent teeth omitted from a plurality of teeth, and a recess is formed between teeth adjacent to the omitted teeth and is directed radially inwardly of the larger diameter sprocket from the dedendum circle thereof, and a projection is formed at an intermediate portion of the recess corresponding to the bottom land between the omitted teeth and extending close to the dedendum.

5 Claims, 4 Drawing Figures

MULTI-SPEED SPROCKET ASSEMBLY FOR A BICYCLE

FIELD OF THE INVENTION

This invention relates to a multi-speed sprocket assembly for a bicycle, and more particularly to a multi-speed sprocket assembly comprising at least two sprockets having different diameters and connectors for connecting the sprockets at a given axial interval.

One of the sprockets is a smaller diameter sprocket having a lesser number of teeth than that of the other, the other sprocket being a larger diameter sprocket having a larger number of teeth, and they are mounted together on a crank or rear wheel hub on the bicycle so that a driving chain is switched to a selected sprocket for changing the bicycle speed.

BACKGROUND OF THE INVENTION

Heretofore, such a multi-speed sprocket assembly comprising two or more sprockets has been well known. A derailleur separate from the sprocket assembly is operated to move a driving chain axially of the sprockets and switch it to a desired sprocket, thereby transmitting a pedalling driving force to a rear wheel hub at the predetermined speed-change ratio.

In order to increase the speed-change ratio, it is enough to increase the difference between the numbers of teeth at the smaller diameter sprocket and the larger diameter sprocket, of the multi-speed sprocket assembly. However, a difference of three or more teeth makes a radius of the addendum circle of the smaller diameter sprocket smaller than a radius of the dedendum circle of the larger diameter sprocket, so that the radial length between the addendum circles of both the sprockets becomes too large making it difficult to switch the chain quickly and smoothly to the desired sprocket. In other words, the driving chain, when switched from the smaller diameter sprocket to the larger diameter sprocket, contacts, prior to engagement with one tooth thereof, a tooth adjacent to and ahead of the one tooth in the direction of normal rotation of the sprocket. Hence, it is difficult to smoothly shift the chain axially outwardly of the larger diameter sprocket for ensuring engagement therewith, resulting in idling of the sprocket. The chain, when switched from the larger diameter sprocket to the smaller diameter sprocket, is intended to disengage from the larger diameter sprocket, but interferes with a tooth thereof positioned behind a tooth ready to disengage the chain, in the direction of normal rotation of the larger diameter sprocket. The chain does not smoothly shift to the smaller diameter sprocket, resulting in unreliable disengagement of the chain from the larger diameter sprocket.

Also, the speed-change ratio, when increased, makes the sprocket ratio larger considerably increasing variations in torque when switching the chain, so that a rider is subjected to a great impact against pedalling to happen to miss his treading on the pedal, which is very dangerous for him.

SUMMARY OF THE INVENTION

This invention has been designed to overcome the aforesaid problems. An object of the invention is to provide a multispeed sprocket assembly which is capable of quickly switching the driving chain to a desired one sprocket even when the smaller diameter and the larger diameter sprockets have a difference of three or more teeth between the numbers of teeth, thereby improving the speed change efficiency and reducing variations in torque when the chain is switched.

This invention is characterized in that the larger diameter sprocket has at least two adjacent teeth omitted from a plurality of teeth of the same. Between the teeth adjacent to the omitted teeth is formed a recess directed radially inwardly of the sprocket from the dedendum circle thereof, and at an intermediate portion of the recess is formed a projection extending close to the dedendum circle from the bottom of the recess.

Such a construction of the invention, whereby at least two adjacent teeth are omitted and a recess is provided as aforegoing, allows the driving chain, when switched, to be shifted a sufficient length axially of the sprocket by a derailleur through the recess without interference. Also, the chain, when switched from the smaller diameter sprocket to the larger diameter sprocket and vice versa, is once relayed by the projection. Hence, even when both the sprockets have a large difference in the numbers of teeth, at the position where the projection is provided, lengths of the position of the tip of the tooth at the larger diameter sprocket and of the position of the tip of the tooth at the smaller diameter sprocket, are transitionary, due to the difference between the numbers of teeth at the sprockets, at two steps between the tooth of the smaller diameter sprocket and the projection and between the projection and the tooth of larger diameter sprocket. Hence, a sprocket ratio between both the sprockets becomes smaller to reduce variations in the torque of the sprocket when switching the chain, resulting in less impact against pedalling so that a rider can avoid the danger of losing his contact with the pedal.

In addition, the number of portions where the omitted teeth are formed is to be determined by the size of the larger diameter sprocket, but at least one portion is sufficient.

It is preferable that the projection is formed in the same shape as the tooth of the sprocket, but it may be made trapezoidal. In brief, it is enough for the projection to be positioned corresponding with the bottom land between the omitted teeth and extend close to the dedendum circle of the larger sprocket so that the chain, when switched, can be relayed by the projection and a chain roller can ride thereon.

DETAILED DESCRIPTION OF THE INVENTION

A multi-speed sprocket assembly of the invention is mounted on a crank and/or a rear wheel hub of the bicycle.

Figure 1:
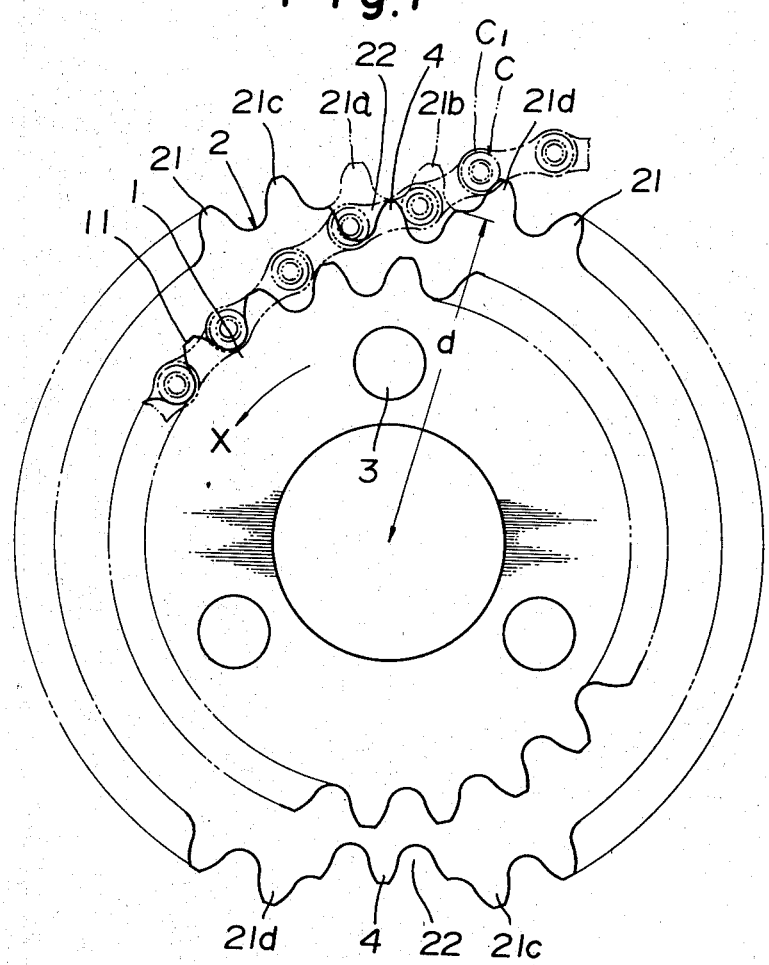
FIG. 1 is a front view of an embodiment of a multi-speed sprocket assembly of the invention.
Figure 2:
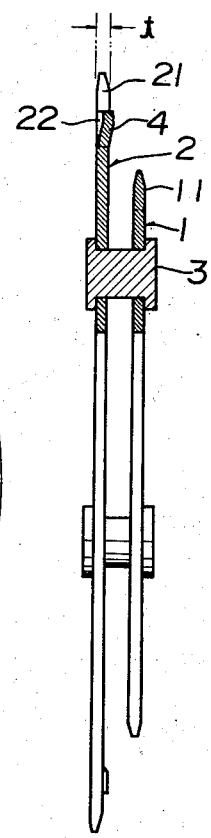
FIG. 2 is a partially cutaway side view of the FIG. 1 embodiment.
Figure 3:
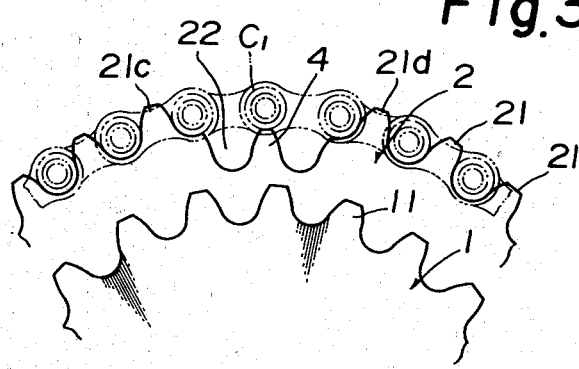
FIG. 3 is a view explanatory of a driving chain in condition of engaging with a larger diameter sprocket.
Figure 4:
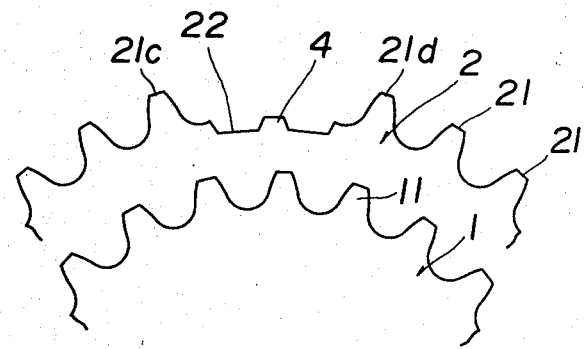
FIG. 4 is a view of a part of a modified embodiment having a projection of a different shape.

The multi-speed sprocket assembly shown in FIG. 1 is mounted on the crank of the bicycle, which comprises a smaller diameter sprocket 1 having a small number of teeth and a larger diameter sprocket 2 having a large number of teeth. At the outer peripehries of the sprockets 1 and 2 are provided a number of teeth 11 and 21 circumferentially at regular intervals respectively, the smaller diameter sprocket 1 having a smaller radius of the addendum circle thereof than that d of the dedendum circle of the larger diameter sprocket 2. The sprockets 1 and 2, as shown in FIG. 2, are connected axially at a given interval by means of a plurality of connectors 3.

The larger diameter sprocket 2 has two adjacent teeth 21a and 21b omitted from a plurality of teeth 21. Between two teeth 21c and 21d adjacent to the two omitted teeth 21a and 21b is formed a recess 22 being directed radially inwardly from the dedendum circle of the sprocket 2 so that a driving chain, when switched to either sprocket 1 or 2, traverse the recess 22. At the middle portion of recess 22 is formed a projection 4 extending close to the dedendum circle of the sprocket 2. The projection 4 relays the chain C when switched, and contacts a roller $C_1$ of the chain C in engagement with the sprocket 2 to thereby prevent the chain from being stretched straight between the teeth 21c and 21d adjacent to the omitted teeth 21a and 21b, thus causing no variation in the chain pitch.

The projection 4 is preferred to be formed in coincidence with each tooth of the sprocket 2 and bent widthwise outwardly of the tooth 21 at the larger diameter sprocket 2 so as to exceed the thickness of a tooth. Hence, the chain C, when switched from the smaller diameter sprocket 1 to the larger diameter sprocket 2, engages easily with the projection 4 and, when switched from the sprocket 2 to the sprocket 1, easily leaves the projection 4.

Alternatively, three to six teeth may be omitted corresponding to a size of the larger diameter sprocket 2 and they are enough to be omitted on at least one portion at the sprocket 2. Also, the projection 4 may be different in shape from the tooth 21 and is enough to extend close to the dedendum circle of the sprocket 2 and bear the roller of chain C.

When the multi-speed sprocket assembly of the invention comprises three to five sprockets and is mounted on the rear wheel hub, the sprockets except for the smallest diameter sprocket have the aforesaid omitted teeth and projections 4 respectively.

In the multi-speed sprocket assembly of the invention constructed according to the foregoing, the chain C, when switched from the smaller diameter sprocket 1 to the larger diameter sprocket 2 as shown by the phantom line in FIG. 1, is biased by a derailleur so as to be shifted toward the sprocket 2. The chain C, when shifted, is slanted to the common axis of sprockets 1 and 2 because a part of chain C positioned ahead in the normal rotation direction (in the direction of the arrow X in FIG. 1) of the sprockets remains at the smaller diameter sprocket 1, and a part of the chain C biased by the derailleur is overshifted to be displaced axially outwardly of the larger diameter sprocket 2, at which time, the chain C traverses the recess 22 to shift toward the larger diameter sprocket 2, thereby smoothly and reliably engaging with the tooth 21d at the sprocket 2. Also, the chain C once rides on the projection 4 at the sprocket 2 and then is relayed therewith to engage with the tooth 21d, so that, even if the sprockets 1 and 2 have a difference of three or more teeth and speed change ratio is made larger, variations in a torque of the sprocket when switching the chain C can be considerably reduced. Accordingly, a rider is not subjected to a great impact against pedalling so that he can avoid losing his footing on the pedal.

The chain C, when switched from the larger diameter sprocket 2 to the smaller diameter sprocket 1, traverses the recess 22 to shift toward the smaller diameter sprocket 1, thereby smoothly and reliably disengaging from the sprocket 2. Also, the chain C, at first, engages with the projection 4 and then engages with the tooth 11 at the sprocket 1, so that, even if a difference of three or more teeth exists between the number of teeth at the sprockets 1 and 2, variations in torque can be considerably reduced to avoid a greater impact against pedalling when changing the bicycle speed.

Furthermore, the projection 4, as shown in FIG. 2, is slanted toward the smaller diameter sprocket 1 so that the sprocket 1, when the chain C is switched therefrom to the larger diameter sprocket 2, can quickly catch the chain C which approaches the sprocket 2, and the chain C, when switched from the sprocket 2 to the sprocket 1, can quickly leave the projection 4. Hence, quick switching of chain C is performable to improve the speed change efficiency.

When the chain C switched to the sprocket 2 passes through the portion of the omitted teeth 21a and 21b, the roller $c_1$ of chain C rides on the tip of projection 4, so that the chain C is not stretched straight between the teeth 21c and 21d adjacent to the omitted teeth 21a and 21b, but is kept shaped in a circular arc, thereby causing no variation in the chain pitch, thereby ensuring engagement of the roller $c_1$ of chain C with the teeth 21c and 21d adjacent to the omitted teeth 21a and 21b. As a result, the tooth 21c ahead in the rotation direction of larger diameter sprocket 2 is not subjected to a converged load, thereby avoiding accelerated wear of the tooth 21c.

As clearly understood from the aforesaid description, the multi-speed sprocket assembly of the invention is so constructed that at least two teeth at the larger diameter sprocket are omitted, and a recess being directed radially inwardly from the dedemdum circle of the larger diameter sprocket, is formed between two teeth adjacent to the omitted teeth so that the chain traverses the recess to be switched, whereby the quick switching of the chain can improve the speed change efficiency even if the sprockets have a large difference between the numbers of teeth.

Furthermore, the projection, which is provided at the middle portion of the recess and extends close to the dedendum circle of the larger diameter sprocket, functions to relay the chain's switching across the sprockets of different diameters. Hence, the chain can be switched with less variation in torque of the sprocket even when both the sprockets have a larger difference between the numbers of teeth and the speed change ratio is increased. As a result, a greater impact pedalling, is avoided so that the rider can safely avoid missing this footing on the pedal.

Moreover, when the chain engages with the larger diameter sprocket, the projection can bear at its tip the chain roller, so that the chain is not stretched straight across the omitted teeth portion, but is kept shaped in a circular arc to eliminate variations in the chain pitch. As a result, the rollers of the chain can reliably engage with the teeth adjacent to the omitted teeth so as to avoid converging a load into one of the adjacent teeth.

While an embodiment of the invention has been shown and described, the invention is not limited to the specific construction thereof, which is merely exemplary in the specification.

What is claimed is:

1. A multi-speed sprocket assembly for a bicycle, comprising at least two sprockets and connectors for connecting said sprockets axially at a given interval, one of said sprockets being a smaller diameter sprocket having a smaller number of teeth than that of a remaining of said sprockets, said remaining sprocket having a larger diameter with a larger number of teeth than that of said one sprocket, said larger diameter sprocket having at least two teeth omitted from a plurality of teeth of said larger diameter sprocket, and being provided between teeth which are adjacent to said omitted teeth with a recess which is directed radially inwardly of said larger diameter sprocket from the dedendum circle thereof, and at an intermediate portion of said recess corresponding to a bottom land between said omitted teeth a projection extending close to said dedendum circle is provided.

2. A multi-speed sprocket according to claim 1, wherein said projection is formed to have a shape the same as the shape of each tooth of said sprockets.

3. A multi-speed sprocket assembly according to claim 1, wherein said projection is shaped in a substantially trapezoid form.

4. A multi-speed sprocket assembly according to claim 1, wherein said projection is displaced toward said smaller diameter sprocket.

5. A multi-speed sprocket assembly for a bicycle for improving the speed change efficiency of a multi-speed bicycle comprising:
 a first teeth bearing sprocket;
 a second teeth bearing sprocket having a diameter larger than said first sprocket, said larger diameter sprocket comprising:
  a series of teeth forming the periphery of said sprocket being equally spaced apart and having a common dedendum, said series of teeth being interrupted by first and second recesses extending from said dedendum towards the center of said sprocket, and by a projection forming a tooth separating said recesses, said projection extending towards said dedendum; and
 means for axially spacing said sprockets whereby an assembly of sprockets is formed.

* * * * *